May 15, 1962 W. SEIGLE 3,034,251
FISHING LINE HOLDER

Filed Nov. 4, 1960 2 Sheets-Sheet 1

WILLIAM SEIGLE
*INVENTOR.*

BY *Loyal J. Miller*

ATTORNEY

May 15, 1962  W. SEIGLE  3,034,251
FISHING LINE HOLDER

Filed Nov. 4, 1960  2 Sheets-Sheet 2

WILLIAM SEIGLE
*INVENTOR.*

BY Loyal J. Miller
ATTORNEY

United States Patent Office 3,034,251
Patented May 15, 1962

3,034,251
FISHING LINE HOLDER
William Seigle, 1619 Elm St., Dallas, Tex.
Filed Nov. 4, 1960, Ser. No. 67,362
6 Claims. (Cl. 43—44.87)

The present invention relates to fishing floats or lures and more particularly to a fishing line clamp for connecting the line to the lure.

The instant invention is a continuation-in-part of an application filed by me in the United States Patent Office on March 4, 1960, under Serial Number 12,768, for Fishing Float, now Patent Number 2,988,840.

The principal object of the instant invention is to provide a means for quickly and easily removably connecting a fishing float to a fishing line intermediate the ends of the line without twisting, wrapping or typing knots in the line.

Another important object is to provide a fishing line clamp for fishing lures wherein the line may be connected with or removed from the float or lure in the dark.

Another object is to provide a fishing line clamp which is positive in operation and which firmly grips the line without damage to the latter.

Another object is to provide a fishing device of this class which forms a guide for connecting the line and wherein stop means, forming a part of the clamp, permits positioning the clamp in line clamping position by a sense of touch.

Still another object is to provide a line clamping device of this class which will firmly grip a fishing line and wherein the clamp may be positioned to permit free movement of the float or lure with respect to the line without removing the lure from the line.

The present invention accomplishes these and other objects by providing guides such as a pair of ring-like members which are secured to the periphery of a lure in spaced-apart relation. An intermediate ring-like member is interposed between the pair of ring-like members and is rotatable with respect to the lure body.

Other objects will be apparent from the following description when taken in conjunction with the accompanying two sheets of drawings, wherein.

Like characters of reference designate like parts in those figures of the drawings in which they occur.

In the drawings.

Figure 1:
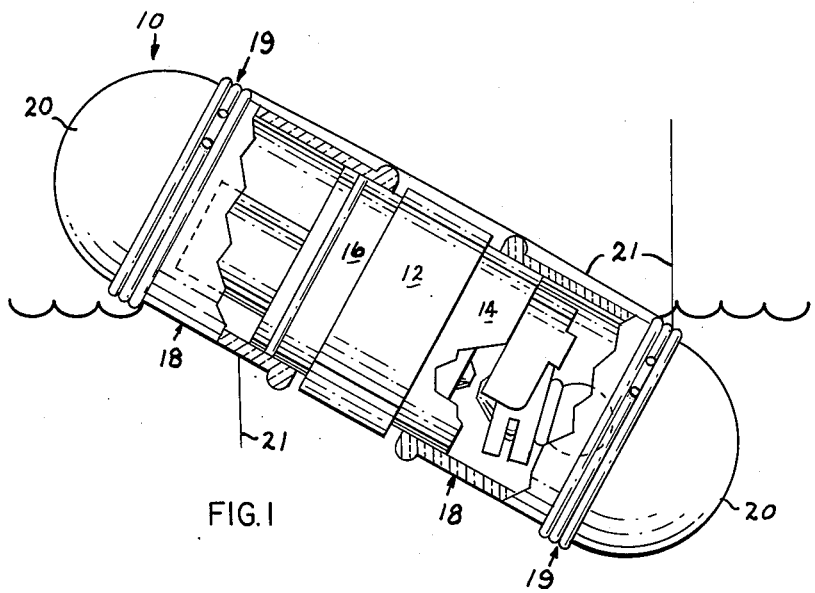
FIGURE 1 is an elevation view of a fishing float illustrating the line clamping means in operative position.

The reference numeral 10 indicates, as a whole, a fishing float having a body portion 12 and reduced end portions 14 and 16 which co-operatively receive cylindrical caps or end closure members 18. One of the clamp means 19 is installed on the periphery of each cap adjacent its hemispherical closed end 20. A fishing line 21 is gripped by the clamp means 19. The float 10 is shown by way of example only since the instant line clamp means may be used on any circular or cylindrical float or lure.

Figure 2:
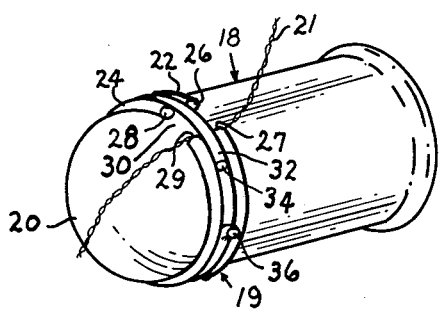
FIGURES 2, 3, 4 and 5, are perspective views of an end portion or cap of the float shown in FIG. 1 illustrating alternate arrangements of the instant invention.

Referring more particularly to FIG. 2, a pair of split rings 22 and 24, which may be of resilient metallic or non-metallic material, are secured to the periphery of the cap 18 adjacent the closed end 20. The respective free ends 26—27 and 28—29, of the rings 22 and 24, are aligned with the longitudinal axis of the cap 18 to define an opening or line receiving guide 30 therebetween. A similar third split ring 32, preferably circular in cross-section, is interposed between the pair of rings 22 and 24 and substantially fills the spacing therebetween. The spacing between the ends 34 and 36, of the intermediate ring 32, is substantially equal to the spacing between the respective ends of the rings 22 and 24. A portion of the ring 32, adjacent the end 36, is preferably turned outwardly of the cap 18 and extends beyond the plane defined by the outer circumferential surface of the rings 22 and 24 for ease in manually grasping the ring 32 and rotating the latter with respect to the cap 18. The ring 32 is preferably tensioned so that it contiguously contacts the periphery of the cap tightly. The underside of a portion of the other end 34, of the ring 32, is preferably arcuately curved outwardly away from the surface of the cap for the purposes which will presently be apparent.

Figure 3:
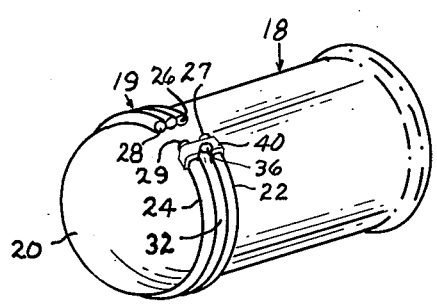

Referring more particularly to FIG. 3, a stop member 40 bridges and is secured to the rings 22 and 24 adjacent their respective ends 27 and 29. The purpose of the stop 40 is to prevent rotative movement of the ring 32 by contact of the upturned end portion 36 with the stop when the ring is rotated to fishing line receiving or releasing position.

Figure 4:
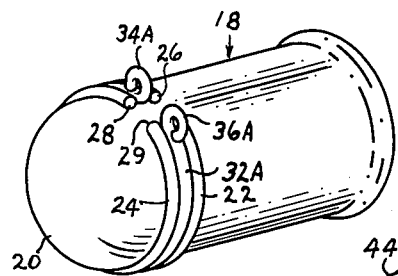

Referring to FIG. 4, the intermediate ring 32A has its respective end portions 34A and 36A arcuately curved back upon itself to form closed loops so that the user may manually determine the position of the same by a sense of touch when connecting or disconnecting a fishing line.

Figure 5:
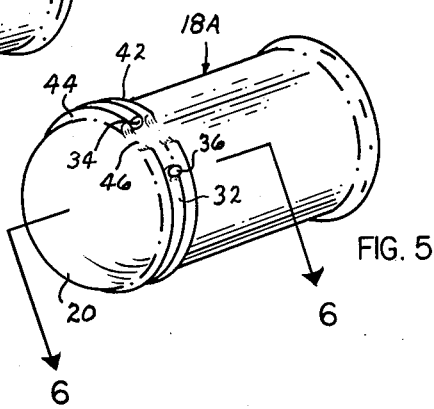
Figure 6:
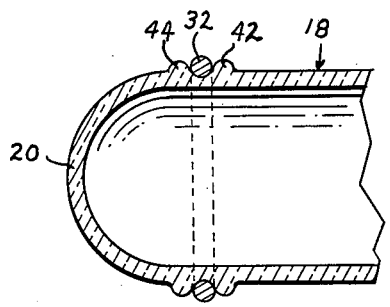
FIGURE 6 is a fragmentary cross-sectional view taken substantially along the line 6—6 of FIG. 5; and, FIGURES 7 and 8 are end elevational views of a fishing float cap illustrating two modifications of the line clamping means.

FIGURES 5 and 6 illustrate an alternate arrangement wherein a pair of ring-like members 42 and 44 are integrally formed on the cap 18A and define a groove or spacing 46 between adjacent end portions of the ring-like members. One of the rotatable split rings 32 is interposed between the ring-like members 42 and 44.

Intermediate its ends the split ring 32 may be arcuately bowed outwardly, as at 48 (FIG. 7), to define an opening 50 between the ring and the periphery of the cap for the purposes which will be presently apparent.

Alternatively the inner periphery of the split ring 32 may be provided with a transverse groove 52 intermediate its ends for similar purposes.

Operation

Figure 7:
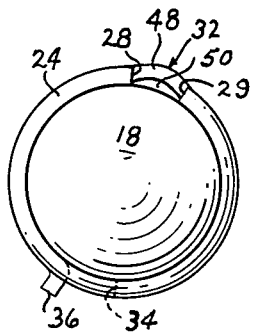
Figure 8:
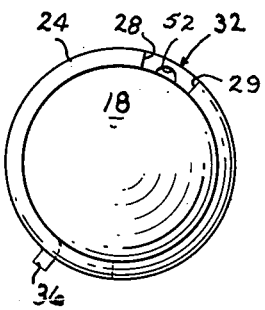

In operation the pair of split rings 22 and 24 are connected to the cap 18, as disclosed hereinabove. The split ring 32 is interposed between the pair of rings 22 and 24. The ring 32 is rotated with respect to the cap so that its respective ends 34 and 36 are substantially aligned with the adjacent ends of the rings 22 and 24. The fishing line 21 is longitudinally disposed within the groove 30 in contact with the surface of the cap. The ring 32 is manually rotated by means of the projection 36 so that its opposing end 34 will pass over the line 21 and impinge the latter against the surface of the cap 18. Removal of the line from the float is accomplished by rotating the ring 32 to the position wherein its ends are substantially aligned with the respective ends of the split rings 22 and 24. When it is desired to move the float along the line without disconnecting the latter, the ring 32 is rotated to position the arcuately curved portion 48 between the opposing ends of the split rings 22 and 24, as shown by FIG. 7, wherein the float may be freely moved along the line. Similarly the alternate groove 52, illustrated in FIG. 8, when positioned as shown permits adjustment of the float longitudinally of the line.

Obviously the invention is susceptible to some change or alteration without defeating its practicability, and I therefore do not wish to be confined to the preferred embodiment shown in the drawings and described herein, further than I am limited by the scope of the appended claims.

I claim:

1. A fishing line clamp for connecting a lure to a fishing line, said lure having a pair of circumferential integral ring portions projecting outwardly of the circumferential plane of the lure and co-operatively terminating at their respective ends to define a fishing line receiving opening extending longitudinally of the lure comprising: a fishing line gripping split ring interposed between said integral ring portions and rotatable with respect to the lure body, said split ring being arcuately bowed outwardly intermediate its ends to define an opening between said split ring and the surface of the lure permitting longitudinal sliding movement of said lure relative to an attached fishing line when the line is positioned therein.

2. A fishing line clamp for attaching a fishing line to a float, said float having a cylindrical portion, comprising: a pair of ring-like members secured in spaced-apart relation to the cylindrical portion of said float; a third ring-like member, circular in cross-section, interposed between said pair of ring-like members and being rotatable with respect to the end portion of said float; means for manually rotating said third ring-like member; and stop means transversely bridging and connected with said pair of ring-like members for limiting the rotative movement of said third ring-like member with respect to said float.

3. A fishing line clamp for attaching a fishing line to a float, said float having a cylindrical portion, comprising: a pair of ring-like members circumferentially secured in spaced-apart relation to the cylindrical portion of said float; a split ring member, circular in cross-section, interposed between said pair of ring-like members and being rotatable with respect to the latter and said float; means formed on said split ring member and projecting outwardly of the circumferential plane defined by the outer limit of said ring-like members for manually rotating said split ring member; and a stop transversely bridging and connecting with said pair of ring-like members and limiting the rotative movement of said split ring member with respect to said float.

4. A fishing line clamp for attaching a fishing line to a fishing float, said float having a circular portion, comprising: a pair of split ring members circumferentially secured in spaced-apart relation to the periphery of the circular portion of said float, the respective opposing ends of said pair of split ring members being aligned with each other and aligned with the longitudinal axis of said float and defining a fishing line receiving opening; an intermediate split ring disposed between said pair of split ring members in contiguous contact with the periphery of said float, said intermediate split ring being rotatable with respect to said pair of split ring members and said float; means formed on said intermediate split ring for manually rotating the latter to fishing line gripping position; and stop means transversely bridging and connecting with said pair of split ring members for limiting the rotative movement of said intermediate split ring with respect to said float.

5. A fishing line clamp for attaching a fishing line to a float, said float having a cylindrical portion; a pair of split ring members circumferentially secured in spaced-apart relation to the periphery of said float, the respective opposing ends of said pair of split ring members terminating in co-operative longituditudinal alignment with the axis of said float and defining a fishing line receiving opening therebetween; an intermediate split ring positioned between said pair of split ring members and rotatable with respect to the latter around said float, at least one end portion of said intermediate split ring being turned outwardly beyond the circumferential plane defined by the outer limit of said split ring members for manually rotating said intermediate split ring; and stop means transversely bridging and connected with said pair of split ring members adjacent the fishing line receiving opening and limiting rotative movement of said intermediate split ring by contact with the outturned end of the latter, said intermediate split ring having an arcuate outwardly bowed portion forming an opening between the latter and the periphery of said float permitting longitudinal sliding movement of said float relative to an attached fishing line when positioned therein.

6. A fishing line clamp for attaching a fishing line to a float, said float having a cylindrical portion; a pair of split ring members circumferentially secured in spaced-apart relation to the periphery of said float, the respective opposing ends of said pair of split ring members terminating in co-operative longitudinal alignment with the axis of said float and defining a fishing line receiving opening therebetween; an intermediate split ring positioned between said pair of split ring members and rotatable with respect to the latter around said float, at least one end portion of said intermediate split ring being turned outwardly beyond the circumferential plane defined by the outer limit of said split ring members for manually rotating said intermediate split ring; and stop means transversely bridging and connected with said pair of split ring members adjacent the fishing line receiving opening and limiting rotative movement of said intermediate split ring by contact with the outturned end of the latter.

References Cited in the file of this patent

UNITED STATES PATENTS

| | | |
|---|---|---|
| 763,557 | Hachmann | June 28, 1904 |
| 1,504,884 | Garst | Aug. 12, 1924 |
| 2,761,235 | Payne | Sept. 4, 1956 |

FOREIGN PATENTS

| | | |
|---|---|---|
| 256,404 | Switzerland | Feb. 16, 1949 |